United States Patent [19]
Tegel, deceased et al.

[11] Patent Number: 5,069,398
[45] Date of Patent: Dec. 3, 1991

[54] GUIDE CABLE PROTECTION FOR AIR ROCKETS

[75] Inventors: Marek Tegel, deceased, late of Schwerte, by Anita Tegel, sole heir; Dieter Wenzel, Haseldorf, both of Fed. Rep. of Germany

[73] Assignee: DMT Marinetechnik GmbH, Hamburg, Fed. Rep. of Germany

[21] Appl. No.: 623,771

[22] Filed: Dec. 7, 1990

[30] Foreign Application Priority Data

Dec. 7, 1989 [DE] Fed. Rep. of Germany ....... 3940467

[51] Int. Cl.⁵ .............................................. F41G 7/32
[52] U.S. Cl. .................................................. 244/3.12
[58] Field of Search ...................................... 244/3.12

[56] References Cited

U.S. PATENT DOCUMENTS 3,069,975  12/1962  Nauschutz et al. ............... 244/3.12

FOREIGN PATENT DOCUMENTS 1214801  12/1970  United Kingdom .

Primary Examiner—Charles T. Jordan
Attorney, Agent, or Firm—Spencer & Frank

[57] ABSTRACT

A protection arrangement for a guide cable of an air rocket started from a launcher and guided into a target by the guide cable. A glass fiber cable is employed as the guide cable for controlling the air rocket. A liquid absorbing material covers at least a portion of the glass fiber cable. A coil chamber at least partially filled with a liquid is provided for storing the glass fiber cable covered with the liquid absorbing material wound in a coil prior to being unwound upon launching of the air rocket.

6 Claims, 2 Drawing Sheets

GUIDE CABLE PROTECTION FOR AIR ROCKETS

CROSS REFERENCE TO RELATED APPLICATION

The present application claims the rights of priority of application Ser. No. P 39 40 467.6, filed Dec. 7th, 1989, in the Federal Republic of Germany, the subject matter of which is incorporated herein by reference.

BACKGROUND OF THE INVENTION

The present invention relates to guide cable protection arrangement for an air rocket started from a launcher and guided into a target by means of the guide cable.

In order to protect the guide cable of wire controlled weapons, it is customary to cover the cable with a flexible protective sheath which protects it against damage of various types. British Patent No. 1,214,801 discloses an example for such a guide cable protection for use with a torpedo.

SUMMARY OF THE INVENTION

It is an object of the present invention to protect a glass fiber guide cable against thermal stresses that occur as the result of recoil gases when a cable guided air rocket is launched.

The above and other objects are accomplished according to the invention by the provision of a protection arrangement for a guide cable of an air rocket started from a launcher and guided into a target by the guide cable, comprising: a glass fiber cable employed as the guide cable for controlling the air rocket; a liquid absorbing material covering at least a portion of the glass fiber cable; and means defining a coil chamber at least partially filled with a liquid for storing the glass fiber cable covered with the liquid absorbing material and wound in a coil prior to being unwound upon launching of the air rocket.

The present invention offers a simple and cost effective protection against excess thermal stresses on the glass fiber cable. The costs for producing the guide cable protection according to the invention are at an optimum ratio to the protection realized thereby. In contrast to a solid coating, the porous covering of the glass fiber cable results in only a slight increase in weight. Further weight saving and cost reducing features of the invention will become apparent from the following description and the appended claims.

One embodiment of the invention will be described in greater detail with reference to the drawing figures.

DESCRIPTION OF THE PREFERRED EMBODIMENTS

Figure 1:
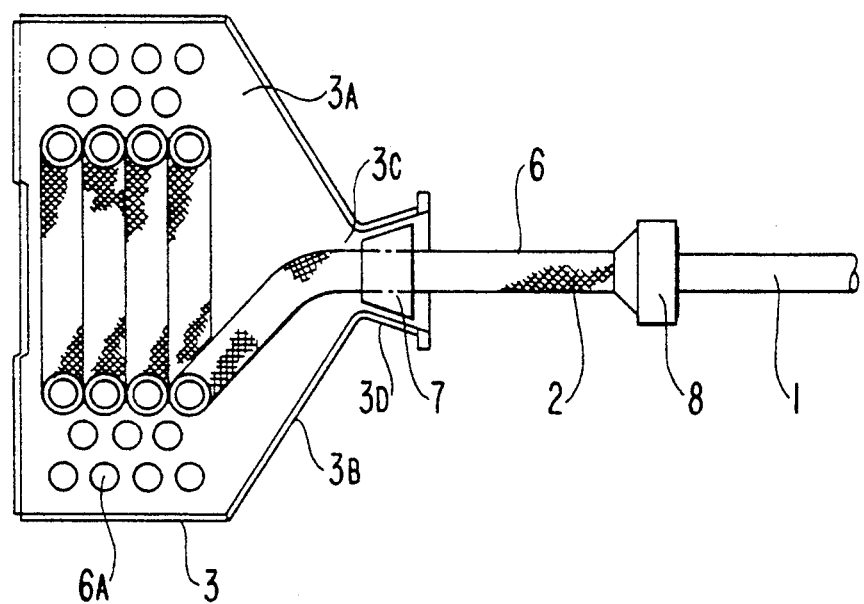
FIG. 1 is a side cross sectional view which shows a protection arrangement according to the invention.

Referring to FIG. 1, there is shown a protection arrangement according to the invention which includes a coil chamber 3 filled with a liquid 3A, for example water, and storing a guide cable 6 wound in a coil 6A. Guide cable 6 comprises a glass fiber 1 covered with a liquid absorbing material 2, such as a hydrophilic fabric cover. Coil chamber 3 is essentially a canister having a frusto-conical end portion 3B provided with an opening 3C through which guide cable 3 is pulled out of the coil chamber. A flanged neck 3D is attached to the edge of opening 3C and receives a closing element or stopper 7. A fastening flange 8 is attached to cable 6 for connecting the cable to a rocket launcher or to an air rocket as further described below.

Cover 2 extends over that part of guide cable 6 which is unwound first and comes in contact with the recoil gases of the launching engine. Before the starting rocket lifts off, coil chamber 3 is sealed by means of a locking element or stopper 7 through which the covered guide cable passes in a length which permits connection of the guide cable to the air rocket (if coil chamber 3 remains behind in the rocket launcher) or to the rocket launcher (if coil chamber 3 is incorporated in the rocket). This connection is effected by means of fastening flange 8. Upon lift-off, the rocket pulls locking element 7, which is fastened to cover 2, out of the opening in coil chamber 3 so that the remainder of the guide cable is able to be unwound without impediment.

The protection for the guide cable against excess thermal stresses is realized in that the liquid absorbed into cover 2 evaporates in the recoil gases and the glass fiber cable is protected by the cooling effect produced by the evaporation.

An alternative embodiment (not illustrated) employing the principles of the invention could provide a protection arrangement in which the covered guide cable, before leaving the coil chamber 3, is drawn through a liquid bath and the remainder of the coil chamber is filled with air.

Figure 2A:
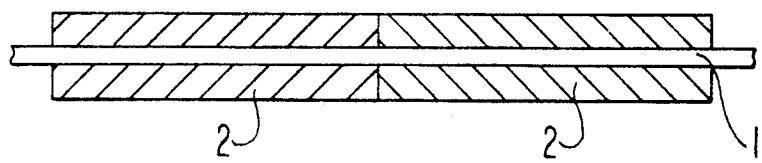
FIGS. 2a to 2c are longitudinal sections which show various types of liquid absorbing materials applied to a glass fiber cable according to the invention and FIG. 2d is a cross section along line d—d of FIG. 2c.
Figure 2B:
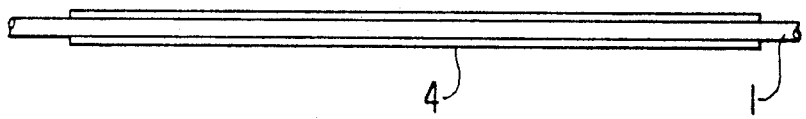
Figure 2C:
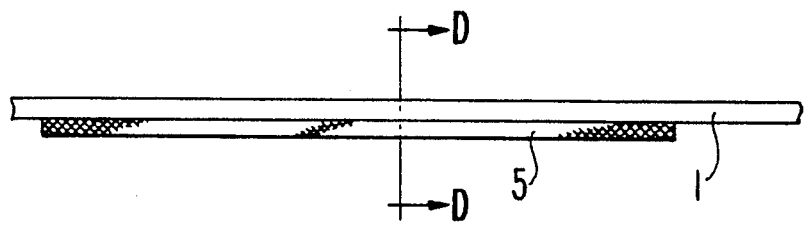
Figure 2D:

FIGS. 2a to 2c show different embodiments for the liquid absorbing material applied to the glass fiber cable. In FIG. 2a, liquid absorbing material 2 is composed of tubes made of a open pored foamed substance which draws up liquid. FIG. 2b shows a thin wetting layer 4 on the surface of the glass fiber cable to which liquid adheres. This layer may be applied to glass fiber cable 1, for example, as a vapor deposited layer. FIG. 2c shows a liquid absorbing material 2 configured as a flat band 5 for glass fiber cable 1. FIG. 2d is a cross section of FIG. 2c. The flat band is able to absorb liquid and may be composed, for example, of open pored foam or a textile fabric.

The tubes 2 shown in FIG. 2a may have an outer diameter of about 1.5 mm and a length of about 10 mm each. The open pored foam material may be of a polyvinyl chloride foam in which water is pressed in before installation on the cable 1.

The hydrophilic fabric cover 2 shown in FIG. 1 may be fabricated out of lamb's-wool, for example.

The flat band 5 shown in FIG. 2c may be composed, for example, either of polyvinyl chloride foam or of lamb's-wool.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A protection arrangement for a guide cable of an air rocket started from a launcher and guided into a target by the guide cable, comprising:

a glass fiber cable employed as the guide cable for controlling an air rocket;

a liquid absorbing material covering at least a portion of said glass fiber cable; and means defining a coil chamber, at least partially filled with a liquid, for storing said glass fiber cable covered with said liquid absorbing material and wound in a coil prior to being unwound upon launching of the air rocket.

2. An arrangement as defined in claim 1, wherein said liquid absorbing material comprises open pored tubes made of a foamed substance and pushed over said glass fiber cable.

3. An arrangement as defined in claim 1, wherein said liquid absorbing material comprises a textile fabric covering.

4. An arrangement as defined in claim 1, wherein said liquid absorbing material comprises a thin wetting layer applied to said glass fiber cable.

5. An arrangement as defined in claim 1, wherein said liquid absorbing material comprises a flat carrier band capable of absorbing liquid.

6. An arrangement as defined in claim 1, wherein said liquid absorbing material is applied to said glass fiber cable only over a length of said glass fiber cable which is unwound first from said coil chamber and which may come into contact with recoil gases of a launching engine associated with the air rocket.

* * * * *